Nov. 12, 1963  E. E. HOOD  3,110,192
TRANSMISSION

Filed Oct. 21, 1960  2 Sheets-Sheet 1

WITNESS:
Esther M. Stockton

INVENTOR.
Edwin Elliott Hood
BY John Phillip Ryan
ATTORNEY

Nov. 12, 1963    E. E. HOOD    3,110,192
TRANSMISSION

Filed Oct. 21, 1960    2 Sheets-Sheet 2

WITNESS:
Esther M. Stockton

INVENTOR.
Edwin Elliott Hood
BY John Phillips Ryan
ATTORNEY

United States Patent Office 3,110,192
Patented Nov. 12, 1963

3,110,192
TRANSMISSION
Edwin Elliott Hood, Elmira, N.Y., assignor to The Bendix Corporation, Elmira Heights, N.Y., a corporation of Delaware
Filed Oct. 21, 1960, Ser. No. 64,083
9 Claims. (Cl. 74—368)

The present invention relates to a transmission for washing machines and the like, and more particularly to a transmission of this type which is adapted for automatic control of its clutch means, and incorporating means within a clutch assembly for cushioning the shock accompanying a change of gear ratio.

In the prior art washing machine transmissions of this type, at least one clutch assembly often consists of a helical coil spring having a free extremity which exerts a prehensile grasp on a driving member. Normally the free extremity of the spring is provided with a radially extending arm which is fastened to a sleeve and the sleeve is in turn prevented from rotating by a solenoid actuated pin member. The pin-sleeve engagement causes the sleeve to be held stationary relative to a driving member and, since the sleeve is held stationary, the spring will also be held stationary having the effect of unwinding the spring, slightly increasing its internal diameter and allowing slippage to occur between the spring and the driving member. When the pin is withdrawn from engagement with the sleeve, there exists sufficient frictional engagement between the spring and the driving member to cause the spring to exert a prehensile grasp on the driving member. This grasp causes the spring to "wrap down" tightly on the driving member establishing a direct driving coupling therebetween. Little or no slippage occurs when the pin is actuated and, therefore, the peak load imposed upon the transmission, due to the rapid acceleration and the considerable inertia of the components driven by the transmission, is usually high.

In my improvement I position means between the clutch spring and the driving member. These means consist of friction shoes having a high coefficient of friction but of a value slightly less than the coefficient of friction existing between the spring and driven member in the prior art embodiments. The force resulting from the prehensile grasp of the spring will apply a load to the friction shoes incurring limited slippage between the shoes and the driving members allowing the peak load to be "slipped off" before direct driving occurs between the power shaft and the associated gear train.

It is desirable and necessary in order to initiate the "wrap down" to have some form of drag or frictional coupling existing between the shoe members and the driving member. The desired and necessary drag can be attained in one of several ways. One method is to use a plurality of segmental shoes combined to form an annulus. The spring will then press each of the segmental shoes against the driving member with sufficient force to provide the desired amount of drag. A second method would be to use a single one-piece shoe having a slot provided therein which will allow limited flexure of the shoe. This one-piece shoe is so dimensioned that it normally tightly engages the driving member and its external surface frictionally engages the free portion of the clutch spring. The forces necessary to press the shoes of either method against the driving member to establish the driving connection will be the result of the spring's prehensile grasp.

Another method for accomplishing the desired results is through the use of individual shoes in slots formed in a bearing sleeve member which constitutes the anchor portion for the spring member and is an integral part of the associated gear train. This method has the added advantages in that it allows the free extremity of the spring to initially exert its prehensile grasp on the driving member thereby providing the initial friction necessary to cause "wrap-down." As the "wrap-down" proceeds along the turns of the spring, the shoes are progressively forced against the sleeve member. The shoes then tend to be self-aligning as the spring changes its length. Shoes used in this manner depend entirely upon radial forces rather than a combination of radial and circumferential forces to cause clutch operation.

It is an object of the present invention as generally described to provide a novel transmission which is efficient and reliable in operation, durable, as well as simple and economical in construction.

It is another object of the invention to provide a transmission having means incorporated in a clutch associated with at least one of the gear trains for dissipating initial momentary overloads incident to the engagement of said associated gear train and for limiting the initial torque transmitted to the gearing and the driven components.

It is still another object of the invention to provide a transmission having friction shoe means which have a coefficient of friction which is high but which is less than the coefficient of friction normally existing between a helical coil wrap-down spring clutch and a driving member, with the friction shoes disposed between the self-tightening clutch spring and the driving member whereby slippage between the shoes and the driving member occurs upon initial actuation of the clutch and allows peak loads to be "slipped off" before direct driving is fully accomplished.

It is a further object of the invention to provide friction shoe means which comprise a split annulus concentrically disposed about the external surface of a driving member providing a drum member for a free portion of the self-tightening spring clutch.

It is still a further object of the invention to provide a transmission having friction means slidably engaging the coupling member, the friction means comprising a plurality of arcuate segmental shoes concentrically disposed about an external surface of the coupling member providing a substantially cylindrical drum member for a free portion of a self-tightening helical spring clutch.

It is yet another object of the invention to provide friction means cooperating with component parts of the associated gear train disposed intermediate the fixed and free extremities of the clutch spring whereby the prehensile grasp of the spring clutch initially engages the driving member to initiate its grasp but the "wrap-down" proceeds along the turns of the spring towards the shoes thus causing limited slippage to occur between the shoes and the driving member which allows the peak driving torques upon gear train engagement to be dissipated until such time as the driven components are accelerated to their normal speeds in unison with the power shaft.

Further objects and advantages will be apparent from the following description taken in connection with the accompanying drawing in which.

Figure 1:
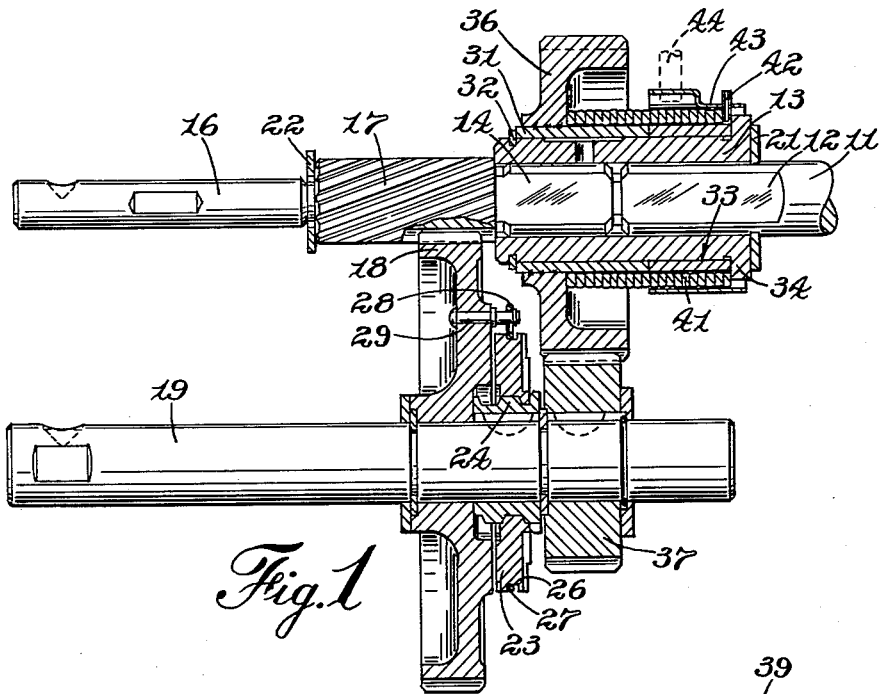
FIGURE 1 is a side elevational view, partly broken away and in section, of an embodiment of the invention illustrating friction means disposed between the driving member and the free portion of the helical coil spring, the clutch being illustrated in its inoperative position.
Figure 4:
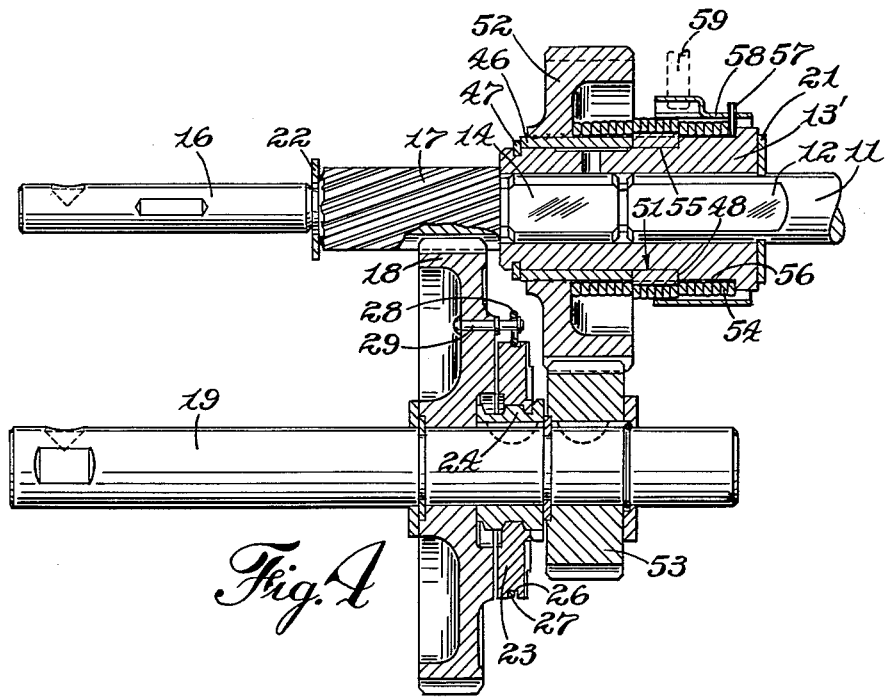
Figure 5:
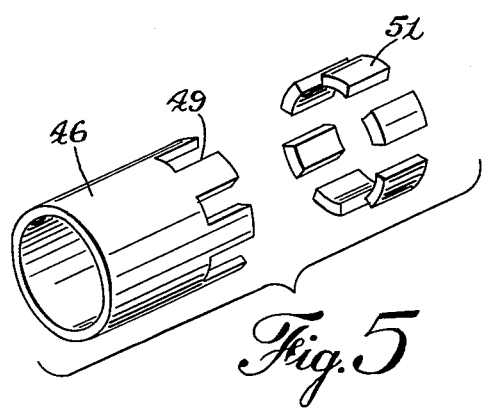

FIGURE 4 is a side elevational veiw, partly broken away and in section, similar to the view of FIGURE 1 and illustrating another embodiment of the invention incorporating friction means interposed between the driving and driven members and positioned intermediate the fixed and free portions of the clutch spring; and FIGURE 5 is a perspective detail view of the friction means and the driven sleeve member of the associated gear train illustrated in FIGURE 4.

In FIGURES 1 and 4 there is illustrated a power shaft 11 which is provided for a portion of its length with a "double-D" section 12 on which a coupling sleeve member 13 (13' in FIGURE 4) is mounted. The coupling sleeve member is provided throughout its bore length with a "double-D" section conforming with and slidably receiving the correspondingly formed and aligned "double-D" section 14 of the driving shaft 16 and the "double-D" section 12 of the power shaft 11.

Mounted on or formed as an integral part of the driving shaft 16 is a driving pinion 17 which is adapted to mesh with a driven gear 18 journalled on a driven shaft 19 located parallel to the driving shaft 16. This described gear train constitutes a low speed driving mechanism.

The coupling sleeve 13 or 13' is retained in alignment and properly positioned by abutting an extremity of the low speed driving pinion 17 and by a snap ring 21 engaging the power shaft 11. Since, in the illustrations, pinion 17 is a separately formed element, it is retained on the driving shaft 16 against axial displacement by a snap ring 22.

The operated elements of the vehicle utilizing this transmission (not shown) are generally mounted on the left-hand extremity of the driving and driven shafts 16 and 19, respectively.

An overrunning clutch connection from the driven gear 18 to the driven shaft 19 is provided comprising a clutch nut 23 threaded on the screw shaft 24 fixedly mounted on the driven shaft. The inclination or hand of the threads of the screw shaft is such that the adjacent surfaces of the driven gear 18 and the clutch nut 23 are brought into clamping engagement by the screw jack action of the screw shaft and nut when driving torque is transmitted through the clutch nut. In order to initiate such driving engagement the clutch nut is provided with a peripheral groove 26 in which a split spring ring 27 is frictionally mounted, said ring having a loop 28 at its leading end. A pin 29 fixedly mounted in the driven gear is arranged to engage the loop of the spring and cause the spring to tighten or draw the clutch nut into clamping engagement with the driven gear.

In the embodiment illustrated in FIGURE 1 a sleeve bearing 31 is journalled on the left-hand extremity of the coupling sleeve member 13 and is held against axial displacement to the left by a snap ring 32 seated in a groove in the coupling sleeve member 13. Abutting the right-hand extremity of the sleeve is friction means generally designated as 33 interposed between the sleeve and a radial flange 34 of the coupling sleeve 13. A ring gear 36 is fixedly secured to one end of the bearing sleeve 31. The ring gear, which provides the driving gear, is arranged to mesh with a driven pinion 37 fixed on the driven shaft 19. The gear train comprising the ring gear 36 and the driven pinion 37 constitute the high speed gear train.

Figure 3:
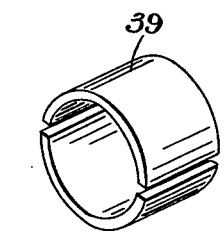
FIGURE 3 is a detail perspective view of another modification of the friction shoe means incorporated in the embodiment illustrated in FIGURE 1.
Figure 2:
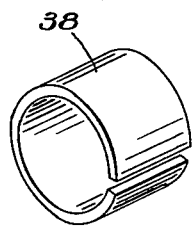
FIGURE 2 is a perspective detail view of one modification of the friction shoe means used in the embodiment illustrated in FIGURE 1.

The friction means 33 can be modified in several ways. The modification in FIGURE 2 illustrates the friction means as a split annulus 38 which is concentrically disposed about the external surface of the coupling sleeve 13 with its external surface providing a drum member for the free portion of a spring 41. For the purposes of this illustration, the sleeve 13 can be synonymously designated the driving member. In FIGURE 3 the frictional means is illustrated as comprising a pair of arcuate segmental shoes 39 which are concentrically disposed about the external surface of the driving member providing a substantially cylindrical drum member for the free portion of a spring 41.

A helical coil clutch spring 41 is arranged to form a driving connection between the driving member 13 and the high speed gear train. The spring has a fixed portion which is secured or anchored to the associated gear train in any convenient manner. It also has a free portion which is concentrically disposed about the external surface of the friction means 33. The free portion of the spring inherently exerts the prehensile grasp upon the external surface of the friction means. An arm 42 extends radially from the free portion into engagement with a sleeve 43. The sleeve 43 is prevented from rotating by engagement with a movable pin 44. Normally the pin 44 and sleeve 43 are engaged and this engagement causes the spring to unwind slightly thereby increasing its internal diameter to diminish or eliminate its prehensile grasp upon the friction means 33. Withdrawal of the pin 44 from engagement with the sleeve 43 allows the spring to "wrap down" and exert its prehensile grasp upon the friction means 33. To effect the withdrawal of the pin 44 a solenoid (not shown) may be utilized.

It is necessary to have some frictional drag between the friction means 33 and the driving member 13 in order to initiate the wrap-down of the spring when the pin is removed. This frictional drag should exist primarily between the friction means 33 and the driven member 13, but it is not detrimental for a slight amount of frictional drag to exist between the free portion of the spring 41 and the external surface of the friction means 33. In the modification illustrated in FIGURE 3, the spring will press the shoes 39 against the driving member causing the frictional drag necessary to initiate the prehensile grasp or "wrap-down" of the spring. In the modification illustrated in FIGURE 2 the single piece shoe 38 is slotted which allows a slight degree of flexing. This single piece shoe is normally dimensioned to have a loose fit on the driving member 13. The forces then necessary to press the shoe against the driving member will be the result of the spring decreasing its inside diameter, and the shoe 38 will be subsequently pressed or urged against the driving member 13 to increase its coefficient of friction.

The coefficient of friction existing between the internal diameter of the friction means 33 and the external diameter of the driving member 13 can be controlled by the proper selection of material and by various ancillary methods of conditioning the internal surfaces of the friction means. These ancillary methods comprise various forms of oil grooves or knurling which tend to break up the surface and thereby raise the unit pressures existing between the shoe members and the driving member.

In operation, rotation of the power shaft 11 is transmitted through the coupling sleeve member 13 to rotate the driving shaft 16. The clutch spring 41 is held out of engagement by the control pin 44. The low speed driven gear 18 is rotated by the driving pinion 17 and transmits torque through its overrunning clutch 23, 24 to the driven shaft 19 which, consequently, rotates the operated elements at a low speed. When it is desired to operate the elements at a higher speed, a solenoid (not shown) is energized and withdraws the pin from the sleeve 43 permitting the clutch spring 41 to exert its prehensile grasp upon the friction means 33 thereby drivingly connecting the high speed ring gear 36 to the driving member 13 which, consequently, rotates the high speed driven pinion 37 and the operated elements at the higher speed. The overrunning clutch is automatically disengaged due to the acceleration of the driven shaft 19.

Although the engagement of the clutch spring is frictional in character, it takes place quickly and positively due to its wrapdown upon the friction means 33. The coefficient of friction existing between the free portion of the spring 41 and the external surface of the friction means 33 will be relatively high as compared to the high coefficient of friction exerted between the internal diameter of the friction means 33 and the external diameter of the driving member 13. The force resulting from the prehensile grasp of the spring wrapping down upon the friction means causes the load to be applied to the shoes. Since the rotating parts of the transmission and of the driven elements to be operated by the transmission have considerable inertia, this sudden change of driving gear ratio places a heavy momentary load on the transmission, power shaft and/or motor which substantially exceeds its normal driving torque. This momentary excessive torque requirement must be dissipated in order to limit the torque transmitted to the gear train. Due to its lower coefficient of friction with the driving member, the friction means will try to rotate with the driving member but will slip off or dissipate a considerable portion of the initial peak load exerted on the power shaft. This momentary dissipation of the excessive driving torque then provides a sufficient time interval for the acceleration of the driven shaft and the operated elements after which the parts may be rotated in unison.

In FIGURE 4 the sleeve bearing 46 is journalled on the left-hand extremity of the coupling sleeve member 13' which is synonymously referred to as the driving member 13' and it is held against axial displacement to the left by a snap ring 47 seated in a groove in the driving member 13'. The right-hand extremity of the bearing sleeve 46 abuts a shoulder 48 of the driving member 13'. The shoulder abutting extremity of the sleeve bearing 46 is provided with a plurality of circumferentially spaced axially extending slots 49. A complementing number of friction shoe means generally designated as 51 are disposed and supported in the slots 49. A ring gear 52 is fixedly secured to the bearing sleeve 46. The ring gear 52 which provides the driving gear is arranged to mesh with the driven pinion 53 fixed on the driven shaft 19. The gear train comprising the ring gear 52 and the driven pinion 53 also constitute a high speed gear train.

The friction shoe means 51 and the bearing sleeve member 46 are more clearly illustrated in FIGURE 5. It will be noted that when the friction shoe means 51 are disposed in the slots 49 they are concentrically disposed about the external surface of the driving member 13' and in frictional contact therewith.

The helical coil clutch spring 54 is arranged to form a driving connection between the driving member 13' and the high speed gear train. The spring has a fixed portion which is secured or anchored to the sleeve bearing 46 of the high speed ring gear 52 in any convenient manner. The spring also has a free portion which is concentrically disposed about the external surface of the friction shoe means 51 and a drum portion 56 of the driving member 13'. The shoe means 51 frictionally engages a lesser diameter drum 55 defined by the shoulder 48. The free portion of the spring 54 as in the case of the previously described spring inherently exerts a prehensile grasp upon the external surfaces of the shoe means. An arm 57 extends radially from the free portion of the spring into engagement with the sleeve 58. The sleeve 58 is prevented from rotating by engagement with a movable pin 59. Normally, the pin 59 and sleeve 58 are engaged and this engagement causes the spring to unwind slightly thereby increasing its internal diameter to diminish or eliminate its prehensile grasp upon the friction means 51 and the drum 56. Withdrawal of the pin 59 from engagement with the sleeve 58 allows the spring to "wrap-down" and exert its prehensile grasp upon the friction shoes 51 and the drum portion 56 of the driving member 13. As in the previous embodiment, the withdrawal of the pin 59 is effected by a solenoid (not shown).

In the embodiment illustrated in FIGURES 4 and 5 the free extremity of the spring is formed so as to have a light frictional contact with the drum member 56. This frictional engagement supplies a sufficient amount of friction to cause the initial spring "wrap-down." As the "wrap-down" progresses along the turns of the spring 54, the frictional shoes 51 are engaged and subsequently forced against the sides of the slots 49 of the bearing sleeve 46 to increase the frictional engagement between the shoes and coupling member. Thereafter, as the "wrap-down" continues, the shoes tend to become self-aligning within the slots.

The operation of this second embodiment is basically the same as that previously described for the embodiment and modifications illustrated in FIGURES 1 thru 3, inclusive. It can also be appreciated that identical elements of both embodiments have been identified by the same reference numerals.

The friction shoe means 51 and the complementing slots 49 of the sleeve bearing 46 can be made of various fitted axial lengths. In this manner frictional engagement can be progressively built up between the driving member 13' and the high speed gear train bearing 46. A similar effect could be accomplished by varying the thickness of the shoes. The shoes utilized in the embodiment illustrated in FIGURE 4 depend entirely upon radial forces for the increase of the frictional engagement to cause its operation rather than upon the combination of radial and circumferential forces.

It will be understood that various changes may be made in the precise form and arrangement of the parts illustrated in the description of the invention. While the disclosures illustrates the inventive features incorporated in the clutch structure of the high speed gear train, it should be understood that it is equally applicable to any clutch structure regardless of whether it is associated with a high, intermediate or low speed gear train. These various changes may be accomplished without departing from the spirit of the invention.

I claim:

1. In a transmission: a power shaft; a driving shaft; a coupling member engaging the power and driving shafts; a driven shaft parallel to the driving shaft; a plurality of gear trains for connecting the driving and driven shafts at different gear ratios; a like plurality of self-tightening clutch means for selectively rendering said gear trains operative; separately operable means for initiating the operation of each clutch; at least one of said clutch means comprising, in combination, friction shoe means slidably engaging the coupling member, a helical coil spring having a portion fixed to a gear of the associated gear train and having a free portion disposed about the friction shoe means adapted upon actuation of the associated operable means to exert a friction increasing prehensile grasp upon the friction shoe means whereby initial momentary overload incident to engagement of said associated gear train is dissipated to limit the initial torque transmitted from the coupling member to the gearing.

2. A transmission as set forth in claim 1 in which the friction shoe slidably engaging the coupling member comprises a split annulus concentrically disposed about an external surface of the coupling member providing a drum member for the free portion of the helical spring.

3. A transmission as set forth in claim 1 in which the friction shoe means slidably engaging the coupling member comprises a plurality of arcuated segmental shoes concentrically disposed about an external surface of the coupling member to provide a substantially cylindrical drum member for the free portion of the helical spring.

4. A transmission as set forth in claim 1 in which: the coupling member includes a first drum surface and a second drum surface having a diameter less than said first drum surface; the gear of the associated gear train to which the spring is affixed including a sleeve member secured thereto, said sleeve having an extremity thereof providing with circumferentially spaced axial slots overlying said second drum surface; the friction shoe means slidably engaging the coupling member further characterized as comprising segmented shoe means disposed in and cooperating with the sleeve slots juxtaposed adjacent a portion of the helical coil spring free portion and the second drum surface; the prehensile grasp of the spring being yieldably initiated at said first drum surface and progressing towards the spring fixed portion whereby the shoe means are caused to increasingly frictionally engage said second drum surface of the coupling member and become aligned within said sleeve slots.

5. A transmission as set forth in claim 1 in which: the coupling member includes a plurality of drum surfaces each having different diameters; means on a gear of the associated gear train providing a seat for the fixed portion of the spring, said means having an extremity thereof overlying one of said drum surfaces and having circumferentially spaced support friction shoe means in said extremity; the means slidably engaging the coupling member and cooperating with the circumferentially spaced support means juxtapositioned between a portion of the spring free portion and said one drum surface; said prehensile grasp of the spring free portion being yieldably initiated at the other of said drum surfaces and progressing towards said one drum surface whereby the shoe means are gradually urged into increasing frictional engagement with said one drum surface of the coupling member.

6. In a transmission; a power shaft, a driving shaft in alignment therewith; a coupling member for the power and driving shafts; a driven shaft parallel to the driving shaft; a low speed driving pinion non-rotatably secured to the driving shaft; a low speed driven gear journalled on the driven shaft adapted to mesh with the low speed driving pinion; clutch means for connecting the low speed driven gear to the driven shaft; a high speed driven pinion non-rotatably secured to the driven shaft; a high speed driving gear rotatably supported on the coupling member; clutch means for connecting the high speed driving gear to the coupling member; separately operable means for initiating operation of the clutch friction shoe means; said clutch means for the high speed gearing comprising, in combination, means slidably engaging the coupling member, a helical coil spring having a portion fixed to the high speed driving gear and having a free portion disposed about the friction shoe means adapted upon actuation of the associated operable means to exert a prehensile grasp upon the friction shoe means whereby initial torque transmitted from the coupling member to the high speed gearing is limited.

7. A transmission as set forth in claim 6 in which the friction shoe means slidably engaging the coupling member comprises a split annulus juxtaposed with an external surface of the coupling member and a free portion of the helical coil spring.

8. A transmission as set forth in claim 6 in which the friction shoe means slidably engaging the coupling member comprises a plurality of arcuate segmented shoes concentrically disposed about an external surface of the coupling member to provide a substantially cylindrical drum member for the free portion of the helical coil spring.

9. A transmission as set forth in claim 6 in which: the coupling member includes a plurality of drum surfaces each having different diameters; means on the high speed driving gear providing a seat for the fixed portion of the spring, said means having an extremity thereto overlying one of said drum surfaces and having circumferentially spaced support means in said extremity; the friction shoe means slidably engaging the coupling member and cooperating with the circumferentially spaced support means juxtapositioned between a portion of the spring free portion and said one drum surface; said prehensile grasp of the spring free portion being yieldably initiated at the other of said drum surfaces and progressing towards said one drum surface whereby the shoe means are gradually urged into increasing frictional engagement with said one drum surface of the coupling member.

References Cited in the file of this patent

UNITED STATES PATENTS

| 1,661,372 | Kroeger | Mar. 6, 1928 |
| 2,004,650 | Collyear et al. | June 11, 1935 |
| 2,235,266 | Starkey | Mar. 18, 1941 |
| 2,563,302 | Atkinson | Aug. 7, 1951 |
| 2,609,702 | Rogers | Sept. 9, 1952 |
| 2,638,791 | Rogers | May 19, 1953 |
| 2,725,758 | Dickey | Dec. 6, 1955 |
| 2,885,896 | Hungerford et al. | May 12, 1959 |